PARAMETRIC OSCILLATOR RANDOM NUMBER GENERATOR

Filed Oct. 30, 1958 2 Sheets-Sheet 1

INVENTOR.
FRED STERZER
BY Morris A. Rabkin
ATTORNEY

PARAMETRIC OSCILLATOR RANDOM NUMBER GENERATOR

Filed Oct. 30, 1958 2 Sheets-Sheet 2

INVENTOR.
FRED STERZER
BY Morris A. Rabkin
ATTORNEY

United States Patent Office 3,069,632

Patented Dec. 18, 1962

3,069,632

PARAMETRIC OSCILLATOR RANDOM NUMBER GENERATOR

Fred Sterzer, Monmouth Junction, N.J., assignor to Radio Corporation of America, a corporation of Delaware Filed Oct. 30, 1958, Ser. No. 770,823
8 Claims. (Cl. 331—47)

This invention relates to random number generators, and more particularly to means and methods for adapting a parametric oscillator to generate random numbers in binary notation.

Many problems in mathematics and physics may be solved by probability procedures which are commonly known as Monte Carlo methods. In many applications of the Monte Carlo method, a large supply of random numbers is required. Random numbers are available in published tables, but when extensive problems are to be solved by a digital computer, it is usually impractical to store the numbers from such a large table in the computer. In fact, many problems require a larger supply of random numbers than is available in tables. Also, in some tables, the numbers are not truly random. In some cases, the computer generates pseudo-random numbers by certain arithmetic processes. However, the more closely one wants the numbers to be truly random, the more involved the arithmetic processes must be, and the longer it takes the computer to generate these numbers.

The present invention provides a method of and means for operating a parametric oscillator as a random number generator. The devices to be described are very inexpensive to construct and operate. The use of such devices provides considerable savings, especially when one considers released computer operating time. A preferred embodiment of the present invention, one constructed of strip transmission line, is capable of generating only truly random numbers at a faster rate than is possible with presently known random number generators.

The basic idea of a parametric oscillator stems from Mathieu's equation. In general, any circuit or device whose resonant frequency is changed at one of certain prescribed rates may be caused to oscillate. If the circuit comprises an element of variable reactance, this may be effected by driving or pumping the circuit with an A.C. signal. Parametric oscillator circuits using voltage-sensitive diodes as the variable reactance elements are shown and described in the copending application of Walter R. Beam and Fred Sterzer, Serial No. 770,822, filed October 30, 1958, for "Parametric Oscillator Circuits," filed concurrently herewith and assigned to the assignee of the present invention. As described in that copending application, the effective capacitance of such a diode depends upon the amplitudes of the A.C. and D.C. voltages across its terminals. If the "natural" frequency and component values of the oscillator are properly selected with relation to the A.C. signal, effective capacitance variation is such that the circuit may be tuned through resonance by changing the amplitude of the A.C. signal. The natural frequency may be defined as the small signal resonant frequency of the tank circuit.

When the natural frequency $f_0$ lies close to the frequency at which oscillations can be sustained by the A.C. signal, the circuit may be driven into oscillation by adjusting the amplitude of the A.C. signal to change the apparent reactance of the variable reactance element an amount sufficient to tune the circuit to the frequency at which oscillations will be sustained. A large output will be obtained at that frequency. The sustained frequency, as is known, is one of certain permissible frequencies related in a simple manner to the pump frequency.

The parameters of the tank circuit may be adjusted, for example, so that the natural frequency lies close to one-half the A.C. signal frequency $f_p$. The tank circuit will be driven into oscillation when the amplitude of the A.C. signal exceeds a critical value, and the oscillations will lock at a frequency $f_p/2$ because of the action of the A.C. signal on the variable reactance element. Two possible phase outputs may be obtained from such an oscillator. These outputs are equal in amplitude and frequency but differ in phase by 180°. Which output will be obtained will be determined by conditions existing in the tank circuit when oscillations commence.

In accordance with the present invention, parametric oscillations in the tank circuit are periodically interrupted for an interval of time sufficient for the oscillations to decay below a threshold value determined by the noise level. If only noise is present when oscillations resume, or if the noise predominates over any other signals present, the phase in which the oscillations resume will be completely random.

It is an object of the present invention to provide a high speed random number generator.

It is another object of the present invention to provide a novel random number generator which makes use of a parametric oscillator.

It is a further object of the present invention to provide a novel method for operating a parametric oscillator as a random number generator.

Yet another object of the present invention is to provide a random number generator which is inexpensive to construct, economical to operate, and capable of generating truly random numbers at a higher rate than presently known devices.

The foregoing and other objects, advantages and novel features of this invention, as well as the invention itself, both as to its organization and mode of operation, may be best understood from the following description when read in connection with the accompanying drawings in which like reference numerals refer to like parts and in which.

Figure 1:
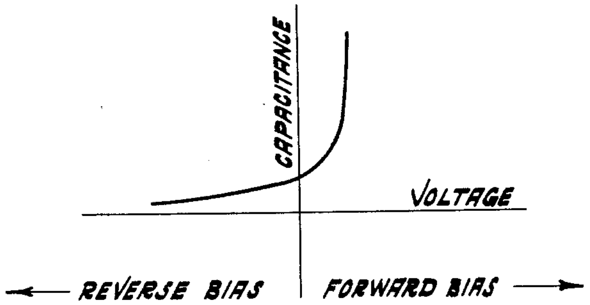
FIGURE 1 is a graph which illustrates the variation of capacitance with voltage for one type of voltage-sensitive, variable capacitance diode.

A semiconductor diode can be used as the active element in a parametric oscillator because its capacitance is a function of the effective voltage across its terminals, and this voltage may be varied in accordance with the A.C. signal. The relationship between capacitance and voltage for one type of semiconductor diode is illustrated graphically in FIGURE 1. In the particular case where the variable reactance element is a diode of the type described, oscillations may be suppressed by applying a voltage pulse to the tank circuit, for example, across the diode. The voltage pulse is preferably of such amplitude and polarity as to drive the diode into the forward conducting region, in which case the diode conducts and the resistance of the diode causes the oscillations to die out at a very fast rate. Oscillations may also be damped by reducing the amplitude of the A.C. signal below the critical value necessary to sustain oscillations.

Although the various embodiments of this invention will be shown and described as comprising voltage-sensitive, variable capacitance diodes, the invention is not meant to be limited to the use of such components. Parametric oscillators, as is known, may be constructed having other variable reactance elements (for example, ferrite cores, iron core transformers, etc.). The variable reactance elements may be of the current-sensitive type.

Figure 2:
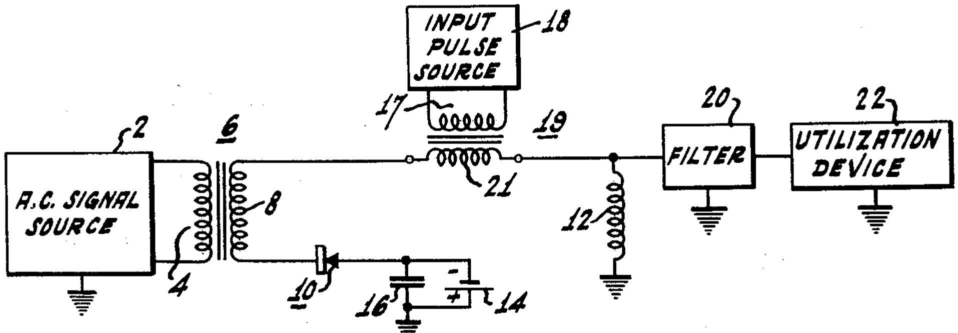
FIGURE 2 is a circuit diagram which illustrates a lumped constant parametric oscillator according to one form of the present invention and a method for operating said oscillator as a random number generator.

One method whereby a parametric oscillator may be used as a random number generator in accordance with the present invention is illustrated in FIGURE 2. The components of the oscillator are of the so-called lumped constant type as distinguished from distributed constants. The output from an A.C. signal source 2 is applied across the primary winding 4 of a signal input transformer 6. The A.C. signal source may be, for example, a klystron, magnetron, or triode oscillator. The secondary winding 8 is connected in the parametric oscillator circuit. An inductor 12 and the secondary winding 21 of a pulse input transformer 19 are serially connected between one end terminal of the secondary winding 8 of the signal input transformer 6 and a point of reference potential, illustrated as circuit ground. A variable reactance element, in this embodiment a diode 10 of variable capacitance, is connected between the other end terminal of the winding 8 and reference ground. If the diode is of the type which draws substantial current in the forward direction, the operation of the oscillator may be enhanced by providing means for biasing the diode in the normally non-conducting direction. Such a biasing means may be a battery 14, poled to bias the anode of the diode negative with respect to the cathode. The battery 14 is preferably of such value that the diode is not driven into conduction by action of the A.C. signals. A capacitor 16 may be connected across the battery 14 to filter high frequency, extraneous, transient signals. For purposes of the present invention, it has been found that the oscillator performs best when the parameters are adjusted so that the "natural" resonant frequency of the tank circuit lies close to one-half the frequency of the A.C. signals.

Voltage pulses from an input pulse source 18 are periodically applied to the oscillator circuit to interrupt the oscillations. These pulses are preferably of such amplitude and polarity as to drive the diode 10 into conduction. In this manner, oscillations rapidly decay to a very low level. The output from the input pulse source 18 is applied across the primary winding 17 of a pulse transformer 19. The secondary winding 21 is connected in the oscillator circuit. The length of the input pulse is adjusted so that the oscillations decay below the noise level. When the pulse is removed, oscillations will resume in a phase determined solely by the noise.

The output from the oscillator circuit may be taken from across the inductor 12. Inasmuch as components of the A.C. source are present in the oscillator circuit, it is desirable to provide, in the output circuit, a filter 20 which blocks signals at the A.C. input frequency and which, in turn, passes signals at the oscillator frequency.

If the oscillator is employed in a system of the type wherein a binary "one" is a signal of given frequency and phase, and a binary "zero" is represented by a signal of the same frequency but displaced 180° in phase from the binary "one," the output from the filter may be used directly in the system. If a binary "one" is represented by R.F. signals and the binary "zero" is represented by the absence of a signal, the output from the filter 20 may be applied to a utilization device 22 which may be, for example, a phase comparator to which is also applied to reference signal. The output of the comparator may also be rectified to provide D.C. pulses for use in some systems.

Figures 3, 4, 5:
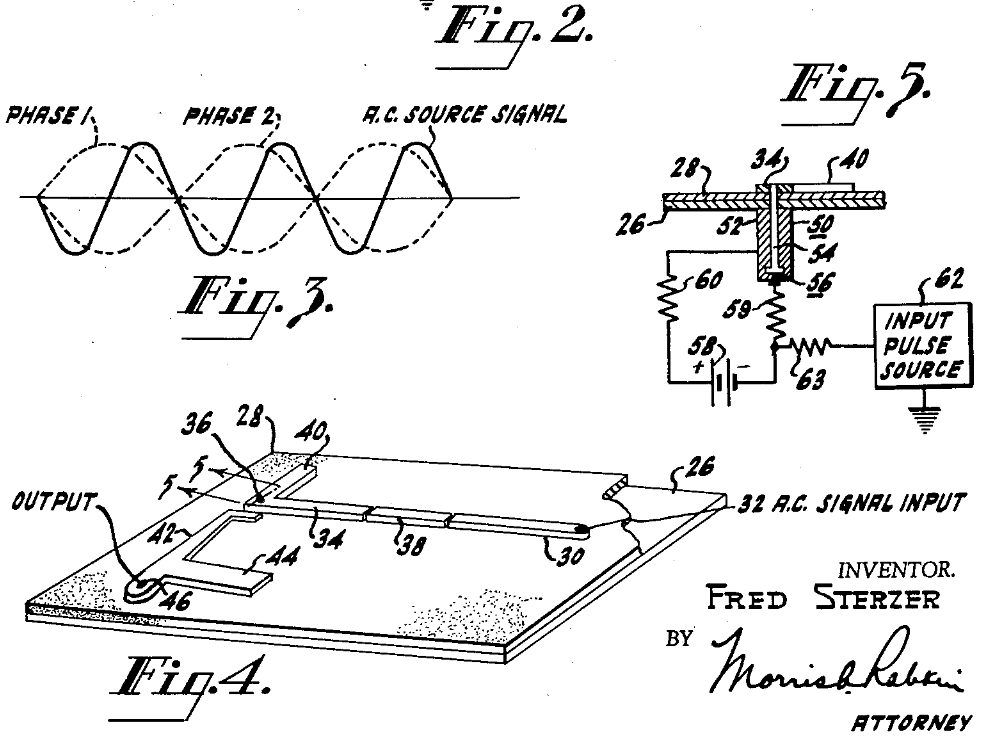
FIGURE 3 is a set of curves which illustrates the two possible phase outputs of a bistable parametric oscillator in accordance with the present invention.
FIGURE 4 is a perspective view of a preferred parametric oscillator for practicing the present invention.
FIGURE 5 is a cross-sectional view of a detail of FIGURE 4 taken along the line 5—5 of FIGURE 4 and showing certain circuit components connected thereto.

FIGURE 3 illustrates the two possible outputs that may be obtained from the circuit of FIGURE 2 as compared with the A.C. signal. These outputs are shown by the dash lines marked "Phase 1" and "Phase 2," while the A.C. signal is shown by the solid line. It will be noticed that the two outputs are equal in amplitude and displaced 180° from each other.

FIGURE 4 is a perspective view of a preferred oscillator for use in practicing the present invention. The components are of so-called strip-transmission line construction. Such strip transmission lines may be constructed by employing a metal ground plate 26 which may be applied as a backing on one side of a suitable dielectric material 28. On the other surface of the dielectric are strips of copper which may be established by printed circuit etching or plating techniques to form the desired circuit. A transmission line is formed between the strip copper and the spaced ground plate 26. The input from the A.C. source may be coupled to the input section 30 at a point 32 from another transmission line (not shown), such as a coaxial line. Coupling between the section 30 and the coaxial line may be provided by any known type of transducer. A suitable transducer for this purpose is described in the copending application of D. J. Blattner and Fred Sterzer, Serial No. 760,225, filed September 10, 1958, for "Logic Circuits," and assigned to the assignee of the present invention. As described in the last mentioned copending application, these transducers preferably include an outer conductor which is connected to the ground plate 26 and an inner conductor which passes through an aperture in the ground plate and the dielectric to make contact with the strip 30, such as at the point 32.

The parametric oscillator circuit comprises a section 34 of strip transmission line and a voltage-sensitive, variable capacitance diode 56 mounted, for example, at the point 36 in the manner illustrated in FIGURE 5. The section 34 of strip transmission line and the diode 56 form a resonant circuit. As in the oscillator circuit previously described, it is preferred, for purposes of the present invention, to operate the oscillator at a frequency one-half that of the A.C. signal input. A filter comprising a section 38 of strip transmission line is inserted between the oscillator section 34 and the input section 30. This section 38 will effectively pass the A.C. input signals to the oscillator and prevent signals at the oscillator frequency from being fed back to the A.C. source if the length of the section 38 is approximately one-half the wavelength at the input signal frequency. Inasmuch as the circuit is physically open between the oscillator section 34 and the input section 30, it is necessary to provide a D.C. return from the parametric oscillator to ground. A section 40 of strip transmission line is provided for this purpose. The section is preferably a quarter wavelength at the oscillator frequency. The end remote from the oscillator is connected to the ground plate 26.

The coupling for the output is in the form of a tapered section 42 of strip transmission line. The portion of the coupling section adjacent the oscillator is tapered down to a small fraction of the normal width of the strip transmission line to provide loose coupling. The coupling may be increased by connecting a wire on the surface of the coupling section to approach nearer the diode resonator.

In the event it is desired to transmit the output signal over a different type of transmission line, such as a coaxial line, the output may be tapped off, for example, at the point 46. A transducer (not shown) of the type previously described may be connected with the inner conductor protruding through an aperture in the ground plate 26 and dielectric 28 to make contact with the output section 42, such as at the point 46.

A filter device may be included for filtering signals at the A.C. input frequency from the output. Such a device may be a section 44 of strip transmission line which is one quarter wavelength at the input signal frequency. The end of the section 44 remote from the coupling section is connected to the ground plate 26.

FIGURE 5 illustrates an arrangement for connecting the variable capacitance diode 56 in the oscillator circuit. A transducer 50 has an outer conductor 52 which is connected to the ground plate 26 and an inner conductor 54 which passes through an aperture in the ground plate to make contact to the section 34. The transducer 50 has a mounting at its termination for the diode 56. The cathode of the diode may be connected to the inner conductor 54. The anode is connected through a resistor 59 to the negative terminal of a suitable biasing source, such as battery 58. The positive terminal of the battery is connected through a resistor 60 to the ground plate 26. The diode 56 and battery 58 may be reversed if desired. A source 62 of input pulses is provided for interrupting the oscillations. Since these pulses have substantially lower frequency content than the parametric oscillations, they may be coupled to the resonant circuit through a resistance element 63.

Figure 8:
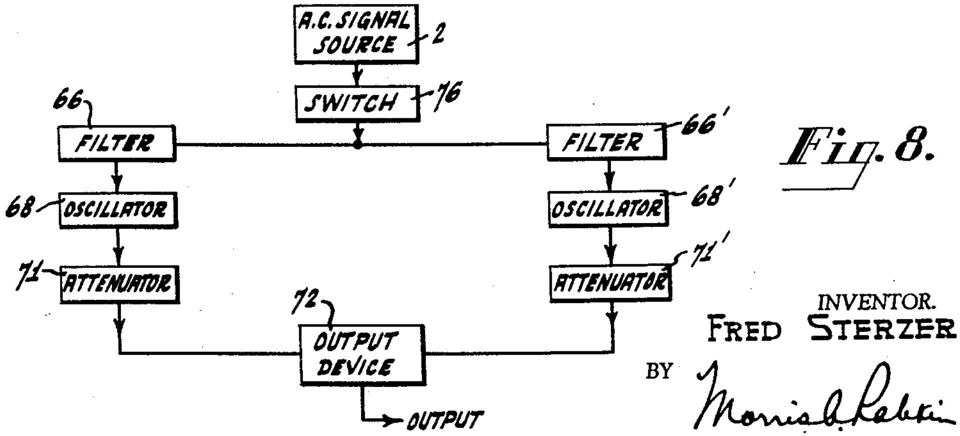
FIGURE 8 is a block diagram of still another embodiment of the present invention.

The operation of the strip-transmission line oscillator is similar to that of the lumped constant oscillator. Pulses from the input pulse source 62 are preferably of such amplitude and phase as to drive the diode 56 into conduction, and of such length as to cause the oscillations to decay below the noise level. The output of the oscillator may be applied to a phase comparator device, such as shown in FIGURE 8. In some applications (for example, in a system using binary phase script notations), the output may be coupled directly into the system.

Figures 6, 7:
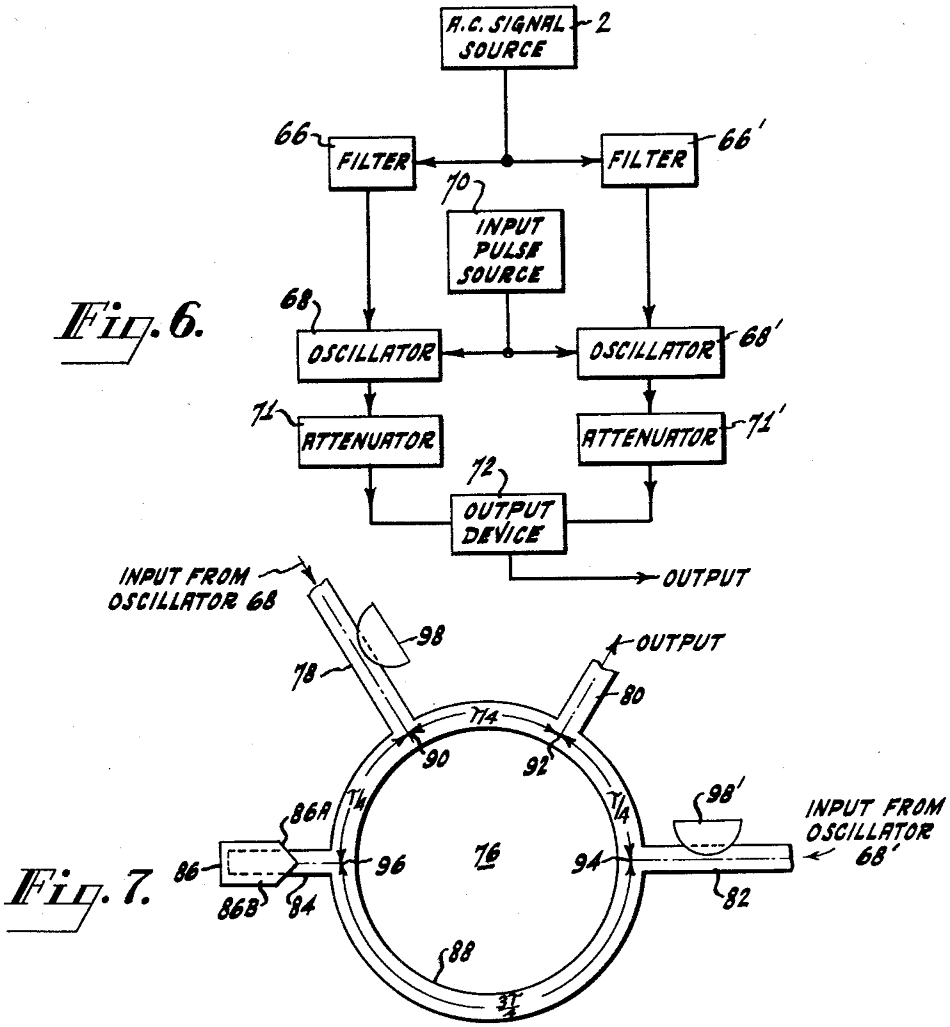
FIGURE 6 is a block diagram of another embodiment of this invention.
FIGURE 7 is a plan view of a suitable phase comparator for use in a system according to the present invention.

FIGURE 6 illustrates in block form a further embodiment of the present invention. A.C. signals from the source 2 are applied over separate transmission lines to filters 66, 66′. The outputs from the filters 66, 66′ are transmitted to parametric oscillators 68, 68′, respectively. The filters transmit signals at the input signal frequency and reject signals at the oscillator frequency. The oscillators 68, 68′ may be of strip-transmission line construction, although any suitable type of parametric oscillator may be employed. These oscillators are both designed to oscillate at the same frequency, which frequency is one-half that of the input signal frequency. A source 70 provides switching pulses for periodically interrupting oscillations. As shown in FIGURE 6, the pulses may be applied simultaneously to both of the oscillators 68, 68′. The outputs from the oscillators are coupled to attenuators 71, 71′, and the outputs from the attenuators are applied to a suitable output device 72. The output device may be a phase comparator. The attenuators 71, 71′ reduce the inputs to the output device and thereby reduce any intercoupling of the oscillators through the output device to assure that the phase of oscillation is completely random. Alternatively, the switching pulses may be applied to only one of the oscillators. In the latter case, the output from the other oscillator, which need not then be a parametric oscillator serves as a reference phase when the phase of that other oscillator is fixed. In order to assure complete freedom from interaction between the oscillators, it is preferable to apply the switching pulses to both oscillators 68, 68′.

If the output device 72 is a phase comparator, a large output will be obtained when the two inputs arrive in phase. The output will be very small, or "zero," when the inputs arrive 180° out of phase. The output from the output device may be coupled directly to a system wherein the binary "one" is represented by R.F. signals at the oscillator frequency, and the binary "zero" is represented by the absence of such R.F. signals. The output from the output device may be rectified to provide pulse-no pulse coding for use in systems employing the latter type of notation.

The oscillators are preferably of strip-transmission line construction for the generation of random numbers at very high speed. In this case, the filters 66, 66′ and interconnecting transmission lines may also be of strip-transmission line construction. A suitable output device and attentuators of strip-transmission line construction are illustrated in FIGURE 7. A hybrid junction 76 in the form of a "rat race" has a first input arm 78, a second input arm 82, an output arm 80, and a fourth arm 84 which is terminated with an absorbtive termination 86, such as is known to the art and which may be a thin flat piece of dielectric material coated on the side adjacent to the terminated arm 84 with absorbtive material, such as graphite. The termination 86 may have a tapered portion **86*a* which is laid over the end part of the arm 84, and a rectangular portion 86*b* into which the tapered portion 86*a* merges. Outputs from the oscillator 68, 68′ are applied to the first and second input arms 78, 82, respectively. The arms 78—84 have junctions 90—96, respectively, with a circular path 88 which is $3\lambda/2$ in means circumference, where $\lambda$ is one wavelength at the oscillator frequency. Electrically, the first arm junction 90 and the output arm junction 92 are one quarter wavelength from the termination arm junction 92 and second input arm junction 94, respectively, and from each other. The junction 94 of the second input arm 82 is three-quarters of a wavelength from the junction 96 of the terminated arm 84**.

The amplitudes of the inputs to the hybrid junction 76 may be adjusted by attenuators 98, 98′. For adjustment, an attenuator may be rotated on a pivot pin located at one corner of the attenuator. The sector shape of the attentuators is illustrative only. These attenuators provide a means for assuring that the inputs arriving at the junction 76 are equal in amplitude. The hybrid junction 76 itself provides about 20 db isolation between the oscillators.

In operation, when the outputs from the oscillators 68, 68′ arrive at the first and second input arms 78, 82 in phase, the signals add in phase at the output arm 80 and cancel at the termination arm 84 because of the properties of the hybrid arrangement. A large output is obtained under these conditions. However, when the outputs from the oscillators arrive out of phase at their respective input arms, the signals cancel at the output arm 80 and add in phase at the termination 84, again because of the properties of the hybrid arrangement. No output is obtained under these circumstances, the energy being absorbed in the termination 86.

FIGURE 8 shows another embodiment of the present invention which is a modification of the embodiment of FIGURE 6. Signals from the A.C. signal source 2 are applied through a switch 76 to the filters 66, 66′. The oscillators 68, 68′ are only driven into oscillation when the amplitude of the A.C. input signal exceeds a certain critical value. As an alternative to applying voltage pulses to the oscillators to dampen oscillations, the coupling between the A.C. signal source and the oscillators may be interrupted by the switch 76. When the output from the A.C. source 2 falls below the critical value, oscillations will not be substained. A suitable switch for practicing this invention is shown and described in the copending application of Fred Sterzer, Serial No. 745,220, filed June 27, 1958, for "Logic Circuits," and assigned to the assignee of the present invention. The switch described in the last mentioned copending application is designed to handle only a few milliwatts of power. When this switch is used in the present invention, it is necessary to limit the power output from the A.C. source 2, and amplify the output of the switch. A traveling wave tube amplifier is suitable for this purpose.

The coupling may be periodically interrupted by applying voltage pulses to the switch. If the coupling is interrupted for a sufficient period of time, the amplitude of the damped oscillations in the oscillator 68, 68′ will decay below the noise level. In this event, when the oscillators are again enabled, the phase in which oscillations resume will be determined by the noise and will be completely random. The arrangement of FIGURE 6 has the advantage over that of FIGURE 8 in that the diodes in the oscillator circuit, or circuits, may be driven into conduction by the input pulses and the oscillations damped at a faster rate, thereby increasing the rate at which random numbers can be generated.

What is claimed is:

1. A random number generator comprising first and second parametric oscillators each having more than one distinct phase of oscillation at one frequency, means for coupling a source of A.C. signals to said oscillators to cause said oscillators to oscillate parametrically at said one frequency, means for periodically causing the amplitude of oscillations in one of said oscillators to decay below a threshold value, said threshold value being below the noise level in said one of said oscillators, said one of said oscillators being adapted to resume oscillations in a phase determined solely by noise following said decay, and a phase comparator coupled to each of said oscillators for providing an indication of the phase of oscillations of said one of said oscillators relative to the phase of oscillations of the other of said oscillators.

2. A random number generator according to claim 1 wherein said second named means in also adapted to cause the amplitude of oscillations in the other of said oscillators to decay below the threshold value of said other oscillator.

3. A random number generator according to claim 1 wherein said last named means comprises a switch device for decreasing below a critical value the amplitude of A.C. signals applied to said one of said oscillators.

4. A random number generator according to claim 1 wherein said one of said oscillators includes a variable capacitance diode.

5. A random number generator according to claim 4 wherein said diode is normally biased in the reverse direction, and said means for periodically causing the amplitude of said oscillations in said one of said oscillators to decay comprises means for driving said diode into conduction in the forward direction.

6. A random number generator comprising a parametric oscillator having more than one distinct phase of oscillation at one frequency, another oscillator, means for coupling a source of A.C. signals to both of said oscillators to cause said oscillators to oscillate at said one frequency, a phase comparator coupled to receive the outputs of both of said oscillators, means for electrically isolating said oscillators from each other at said one freqency, and means operative periodically to cause the amplitude of oscillations in said parametric oscillator to decay below the noise level of said parametric oscillator and to increase when said noise predominates over any other signals present in said parametric oscillator.

7. A random number generator according to claim 6 wherein said periodically operative means includes a source of energizing pulses of selected amplitude and duration coupled to said parametric oscillator.

8. A system for generating random numbers in phase script notation comprising: a parametric oscillator having more than one distinct phase of parametric oscillation at the same frequency and having a noise level, said oscillator including a variable capacity diode and means normally biasing said diode in the reverse direction, means applying A.C. signals to said oscillator to cause said oscillator to oscillate parametrically, and means for applying periodically to said oscillator direct current pulses having an amplitude sufficient to bias said diode into conduction in the forward direction to cause said oscillations to decay and a duration sufficient to permit said oscillations to decay below said noise level.

References Cited in the file of this patent

UNITED STATES PATENTS

| | | |
|---|---|---|
| 2,815,488 | Von Neumann | Dec. 3, 1957 |
| 2,838,687 | Clary | June 10, 1958 |

FOREIGN PATENTS

| | | |
|---|---|---|
| 778,883 | Great Britain | July 10, 1957 |